United States Patent [19]

Lange

[11] 4,227,901

[45] Oct. 14, 1980

[54] FILTER-DRIER FOR HEAT PUMP SYSTEMS

[75] Inventor: Harold T. Lange, St. Louis, Mo.

[73] Assignee: Sporlan Valve Company, St. Louis, Mo.

[21] Appl. No.: 928,234

[22] Filed: Jul. 26, 1978

Related U.S. Application Data

[63] Continuation-in-part of Ser. No. 789,360, Apr. 21, 1977, Pat. No. 4,104,044, which is a continuation-in-part of Ser. No. 729,670, Oct. 5, 1976, Pat. No. 4,029,580.

[51] Int. Cl.² .................. B01D 27/02; B01D 35/02; B01D 53/04
[52] U.S. Cl. .......................... 55/301; 55/316; 55/387; 210/266; 210/282; 210/428; 210/434
[58] Field of Search ............... 55/301, 316, 387; 210/136, 266, 282, 428, 433 R, 434

[56] References Cited

U.S. PATENT DOCUMENTS

| | | | |
|---|---|---|---|
| 281,336 | 7/1883 | Blackmer | 210/434 X |
| 2,556,292 | 6/1951 | Newcum | 55/316 |
| 2,601,925 | 7/1952 | Anderson | 210/434 |
| 2,723,035 | 11/1955 | Anderson | 210/434 X |
| 3,175,342 | 3/1965 | Balogh | 210/266 X |
| 3,178,022 | 4/1965 | Balogh | 210/266 X |
| 3,794,179 | 2/1974 | Doucet | 210/433 R X |
| 3,815,752 | 6/1974 | Hoffman et al. | 210/266 |
| 3,841,490 | 10/1974 | Hoffman et al. | 210/266 |
| 4,029,580 | 6/1977 | Lange | 210/136 |
| 4,104,044 | 8/1978 | Lange | 210/136 X |

Primary Examiner—Robert H. Spitzer
Attorney, Agent, or Firm—Cohn, Powell & Hind

[57] ABSTRACT

A filter-drier unit for heat pump systems in which desiccant is located in a housing between an inlet and an outlet, a screen is provided in the housing between the inlet and desiccant for enabling a first flow from the inlet through the screen and desiccant, and a passage is provided for bypassing the desiccant and enabling a second flow from the inlet through the bypass passage, the screen collecting the desiccant upon any reverse flow for precluding migration of desiccant out of the inlet. The screen is located relative to the inlet and bypass passage so that the second flow engages and moves past the screen for washing the screen. A filter is provided in the housing between the desiccant and outlet for receiving the first flow through the desiccant and for receiving the second flow from the bypass passage prior to movement through the outlet. In one embodiment, the screen is a tube having one open end communicating with the inlet and an opposite open end communicating with the interior of the housing downstream of the desiccant, the screen extending longitudinally through the desiccant, and the bypass passage is provided by the interior of the screen tube between its open ends. In another embodiment, the screen extends across a holder containing the desiccant, the screen being located upstream of the desiccant and spaced from the inlet, and the holder is spaced from the housing to provide the bypass passage therebetween communicating with the space between the inlet and screen.

1 Claim, 7 Drawing Figures

FILTER-DRIER FOR HEAT PUMP SYSTEMS

CROSS-RELATED APPLICATIONS

This application is a continuation-in-part of copending application Ser. No. 789,360, filed on Apr. 21, 1977, now U.S. Pat. No. 4,104,044 which is a continuation-in-part of application Ser. No. 729,670, filed on Oct. 5, 1976, now U.S. Pat. No. 4,029,580 that was copending with U.S. Pat. No. 4,029,580.

BACKGROUND OF THE INVENTION

This invention relates generally to improvements in a filter-drier unit for use in the liquid line of reverse-cycle refrigeration and air-conditioning systems, more commonly known as heat pumps.

Filter-driers have been used in the conventional refrigeration and air-conditioning systems which only have flow in one direction. Therefore, the screens and filtering media of these filter-driers are normally at the outlet end to collect not only dirt from the system but to prevent any possible desiccant migration out of the outlet end of the filter-drier.

Screens or other filtering media at the inlet of such heretofore conventional filter-driers are sometimes used, but are not required. When such screens or other filter media are used, they are used primarily to retain the desiccant. Usually, the inlet portion of these filter-driers is not suitable for installing any type of screen or filter media because the filtering area is very small. Consequently, any dirt from the system would rapidly plug up the small filtering area of the screen. Therefore, such filter-driers usually avoid the use of a small area screen at the inlet end because it will rapidly plug up.

If these heretofore conventional filter-driers are used in heat pump systems in which there is a reverse flow or draining of liquid refrigerant out of the inlet fitting of the filter-drier, some crushed desiccant particles in the desiccant bed will be washed out of the inlet fitting and into the expansion device of the system, thereby causing a likelihood of blockage of the refrigerant flow.

SUMMARY OF THE INVENTION

The present filter-drier precludes possible desiccant migration out of the inlet fitting when the filter-drier is used on a heat pump system, while at the same time avoiding the problem of a small area filter at the inlet end of the filter-drier which would plug up from dirt from the system.

In the present filter-drier assembly, desiccant is located in a housing between a housing inlet and outlet. Flow-directing means including a screen is disposed in the housing between the inlet and the desiccant for enabling a first flow from the inlet through the screen and desiccant, and includes a passage bypassing the desiccant for enabling a second flow from the inlet through the passage. The screen collects the desiccant upon any reverse flow through the housing for precluding migration of desiccant out of the inlet.

The screen is located relative to the inlet and the bypass passage so that the second flow engages and moves past the screen for washing the screen.

A filter means is provided in the housing between the desiccant and the outlet for receiving the first flow through the desiccant and for receiving the second flow from the bypass passage prior to movement through the housing outlet.

In one embodiment, the screen is a tube extending longitudinally of the housing and through the desiccant, the screen tube having one open end communicating with the inlet and an opposite open end communicating with the interior of the housing downstream of the desiccant. The bypass passage is provided by the interior of the screen tube between its open ends.

In another embodiment, the screen extends across a holder containing the desiccant, upstream of the desiccant and spaced from the housing inlet, the holder being spaced from the housing to provide the bypass passage therebetween which communicates with the space between the housing inlet and the screen.

DESCRIPTION OF THE PREFERRED EMBODIMENTS

Figure 1:
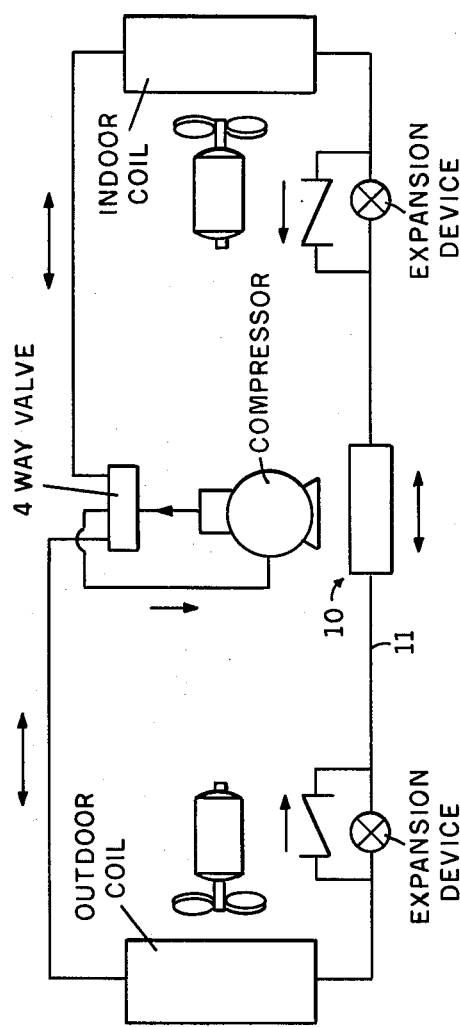
FIG. 1 is a diagram of a heat pump system utilizing the filter-drier assembly disclosed in FIG. 2 in the liquid of the system.
Figure 2:
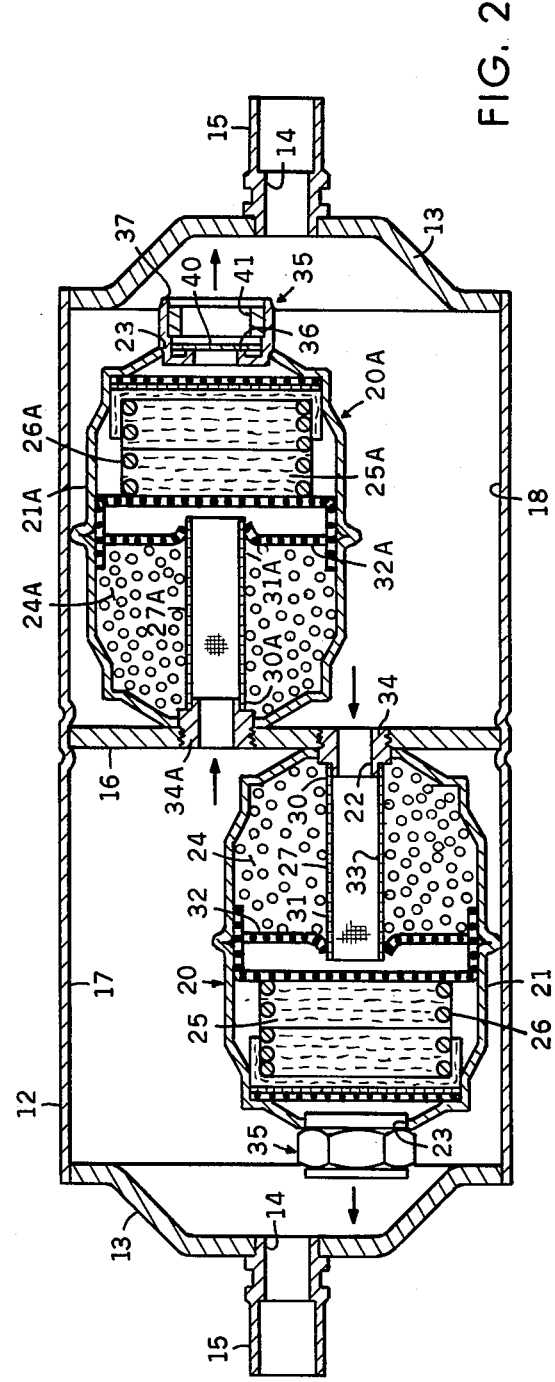
FIG. 2 is a longitudinal cross-sectional view of the filter-drier assembly utilized in the system of FIG. 1.

Referring now by characters of reference to the drawings, and first to FIG. 1, it will be understood that the heat pump system in which the filter-drier assembly 10 of FIG. 2 can be used, includes a compressor connected through a four-way valve to an outdoor coil and an indoor coil, the outdoor and indoor coils being interconnected by a liquid line 11. A pair of expansion devices are located in the liquid line 11, one such expansion device being located ahead of the outdoor coil for use in one mode of operation and another such expansion device being located ahead of the indoor coil for use in the other mode of operation. The filter-drier assembly 10 is located in the liquid line 11 between the expansion devices so as to provide protection for both such devices.

The construction of the filter-drier assembly 10 is illustrated in FIG. 2. In this embodiment, the filter-drier assembly 10 includes a substantially cylindrical shell 12 closed at the ends by caps 13. Flow ports 14 are provided in the end caps 13 by the end connections 15.

Fixed to the shell 12 and extending across the interior substantially at mid-length, is a partition 16 that provides separate interior compartments 17 and 18. Each of the compartments 17–18 connects to one of the flow ports 14.

Located in each of the compartments 17–18, is an individual filter-drier unit 20 and 20A respectively, that are constructed similar to those disclosed in U.S. Pat. No. 3,025,233 or in U.S. Pat. No. 3,815,752 but with important modifications. Because the component parts are identical, the filter-drier unit 20 and its connection will be briefly described and such description will suffice for the other filter-drier means 20A and its connection. The only difference is that the reference numerals for the filter-drier unit 20A and its connection will have the suffix letter A.

Briefly, the filter-drier means 20 includes a housing 21 having an inlet 22 at one end and an outlet 23 at the other end. A desiccant 24, constituting an adsorbent material bed, is contained in the housing 21 adjacent the housing inlet 22. A filter media 25 of inorganic fibrous material is disposed in a wire form 26 extending substantially to and between the desiccant 24 and the housing outlet 23.

A screen tube 27, constituting part of a flow-directing means, is located in the housing 21 between the inlet 22 and the desiccant 24 for enabling a first flow from the inlet 22 through the screen tube 27 and desiccant 24. More particularly, the screen tube 27 has one open end 30 mounted about the inlet 22 for receiving flow directly from the inlet 22, and an opposite open end 31 downstream of the desiccant 24 mounted in a perforated plate 32, constituting a foraminous means, extending across the housing 21 and containing the desiccant 24. The interior of the screen tube 27 provides a bypass passage 33 between its open ends 30–31 for enabling a second flow from the inlet 22 through the passage 33 and bypassing the desiccant 24. The screen tube 27 collects the desiccant 24 upon any reverse flow for precluding migration of desiccant 24 out of the inlet 22.

The screen tube 27 is located relative to the inlet 22 and the bypass passage 33 so that the second flow engages and moves past the screen 27 for washing the screen tube 27.

A conduit means connects the inlet 22 of filter-drier unit 20 with the compartment 18, which is the compartment other than the one in which the filter-drier unit 20 is located. This conduit means, in the embodiment of FIG. 2, includes a fitting 34 threadedly attached to the partition 16 and providing the inlet 22 that connects the associated filter-drier unit 20 with the compartment 18. Disposed in the outlet 23 of filter-drier unit 20 is a check valve means 35 that enables flow only into the compartment 17 in which the filter-drier unit 20 is located, and precludes backflow through such filter-drier unit 20.

The details of construction of the check valve means 35 are fully disclosed in U.S. Pat. No. 4,029,580, and is also shown in the illustration of filter-drier unit 20A in FIG. 2. The check valve means 35 includes an inlet valve port as defined by a valve seat 36 at one end, and an outlet 37 at the opposite end. Movably mounted and selectively engaging the valve seat 36 under liquid pressure, is a valve plate 40. It will be understood that the valve plate 40 is provided with radially extending, peripherally spaced fingers that provide a passage past the valve plate 40 when the valve plate 40 is moved away from the valve seat 36. A cylindrical tubular stop 41 engages the valve plate fingers to limit the movement of the valve plate 40 as it moves away from its valve seat 36 to open the valve port under liquid pressure. When the valve port is open, the flow is through the port, between the valve plate fingers and past the stop 41 for discharge through the outlet 37. Liquid pressure on the opposite side of the valve plate 40 will move the valve plate 40 against the valve seat 36 and close the valve port, thereby preventing backflow in the associated filter-drier unit 20A.

From FIG. 2, it will be understood that the filter-drier units 20 and 20A and the associated fittings 34 and 34A are relatively laterally offset in the shell 12. More particularly, they are laterally offset from the longitudinal center axis of the shell 12.

With the filter-drier assembly 10 disposed in the liquid line 11 of a heat pump system in the manner shown in FIG. 1, it will first be assumed that flow is into the compartment 17 through its associated shell port 14. As the refrigerant liquid flow passes into the shell compartment 17 through the port 14, the check valve means 35 of the filter-drier unit 20 located in the compartment 17, will close to preclude backflow through such filter-drier unit 20. The liquid will pass by the filter-drier unit 20 and will pass into the inlet 22A of the filter-drier unit 20A. A portion of the refrigerant liquid flows through the screen tube 27A and through the desiccant 24A, and thence through the perforated plate 32A. Another portion of the refrigerant liquid flows through the bypass passage 33A and is discharged downstream of the desiccant 24A through the tube end 31A. These liquid flows are then combined and pass through the filter media 25A, thence through the outlet 23A, and discharged into the shell compartment 18 in which the filter-drier unit 20A is located, through the associated check valve means 35. The liquid then is discharged from the compartment 18 through the associated shell port 14 in connection 15.

Flow of the refrigerant liquid in the opposite direction in the liquid refrigerant line 11 will cause liquid to enter the shell compartment 18 through the associated shell port 14 in connection 15 at the right-hand end of FIG. 2. The liquid pressure will cause the check valve means 35 of the filter-drier unit 20A to close to prevent backflow through such filter-drier unit 20A. The liquid will pass by the filter-drier unit 20A in the compartment 18 and will pass into the inlet 22 of the filter-drier unit 20. After passing through the filter-drier unit 20 in the manner previously described with respect to filter-drier means 20A, the liquid passes into the shell compartment 17 through the check valve means 35 of the filter-drier unit 20, and then is discharged from the compartment 17 through the associated shell port 14 in the connection 15.

If the filter-drier assembly 10 of FIGS. 1–2 is located in a vertical position with one of the filter-drier units 20–20A below the other, i.e., the filter-drier unit 20A below the filter-drier unit 20, the cylindrical screen tube 27 in the filter-drier unit 20 precludes any crushed desiccant 24 from being washed out of the inlet 22 as the liquid in this filter-drier unit 20 drains out of inlet 22. It will be understood that if desiccant particles are washed out of the filter-drier unit 20 and into the compartment 18, they will be mixed with the liquid coming out of the filter-drier unit 20A and will be transported out of the bottom of the shell 12 and into the expansion device of the system, thereby causing possible blockage of the refrigerant flow.

The screen tube 27 avoids possible desiccant migration out of the inlet 22 of the filter-drier unit 20 on a heat pump system, and at the same time avoids the problem of a small area filter at the inlet end of the filter-drier unit 20 which would plug up with dirt from the system. Preferably, the screen is approximately 80 mesh. Any dirt from the system that might tend to be collected by the cylindrical screen tube 27 is washed off and into the filter media 25. There is sufficient pressure drop through the outlet end 31 of the screen tube 27 to force some of the liquid flow through the mesh of the screen tube 27 and therefore through the desiccant 24. This flow serves to dry the refrigerant. Tests have proved that sufficient flow of refrigerant is passed through the desiccant 24 for adequate moisture removal from the refrigerant, and at the same time have demonstrated that the screen tube 27 does not plug with dirt.

Figure 4:
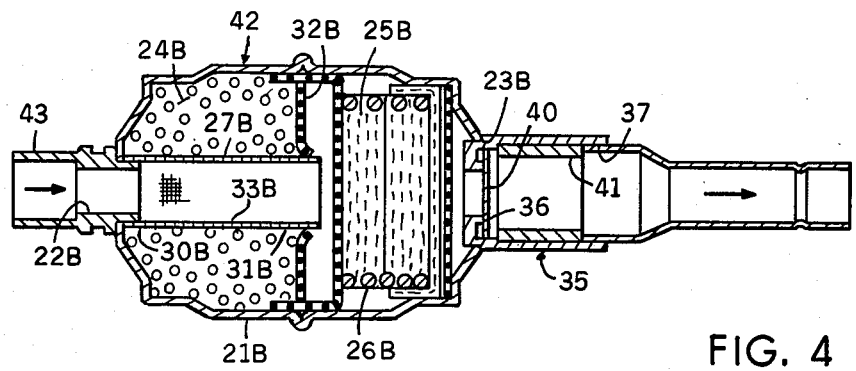
FIG. 4 is a longitudinal cross-sectional view of the filter-drier unit utilized in the system of FIG. 3.

The embodiment shown in FIG. 4 relates to the inventive features utilized in a single filter-drier unit 42 rather than a dual, reversible filter-drier assembly 10. The heat pump system utilizing this general type of filter-drier unit 42 has been fully disclosed in detail in copending U.S. Pat. No. 4,104,044. Briefly, the filter-drier unit 42 of FIG. 4 corresponds essentially to the structure of the filter-drier units 20 and 20A previously described in detail. Accordingly, the corresponding parts of filter-drier unit 42 will be given corresponding reference numerals except that they will include the suffix letter B.

Briefly, the filter-drier unit 42 includes a housing 21B having a fitting 43 providing an inlet 22B at one end and an outlet 23B at the other end. The desiccant 24B, constituting an adsorbent material bed, is contained in the housing 21B adjacent the inlet 22B. The filter media 25B is disposed in the wire form 26B extending between the desiccant 24B and the housing outlet 23B.

The check valve means 35 is identical to the one previously described with respect to the filter-drier units 20 and 20A and the ports have been given the same reference numerals. The check valve means 35 enables flow only through the housing 21B and the filtering and drying means 24B-25B from inlet 22B to outlet 23B, and precludes backflow into the housing 21B through the outlet 23B.

Figure 3:
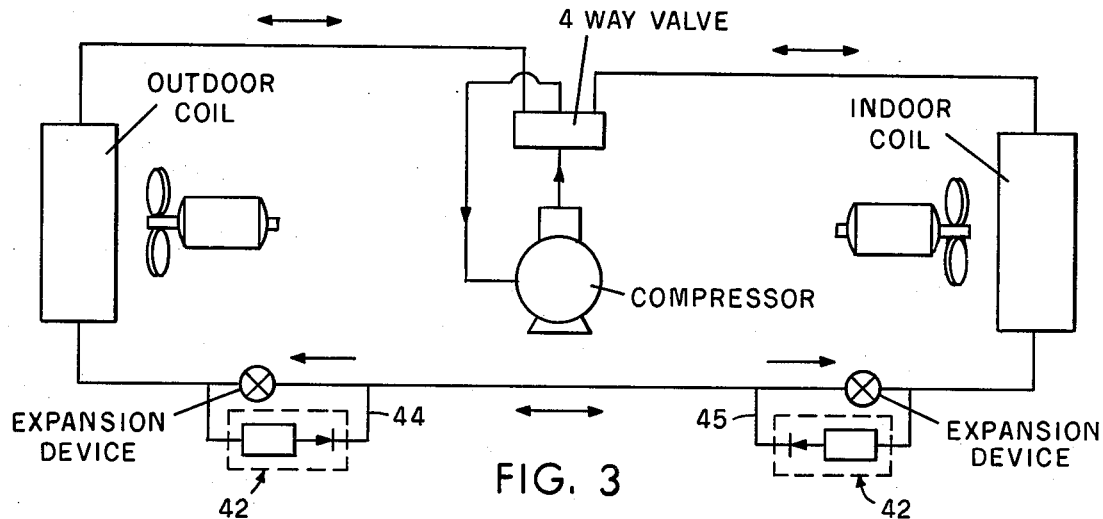
FIG. 3 is a diagram of a heat pump system utilizing the filter-drier unit of FIG. 4 in the liquid line.

In the heat pump system disclosed in FIG. 3 utilizing the filter-drier unit 42 of FIG. 4, a bypass line 44 is provided in the liquid line 11 across the first expansion device ahead of the outdoor coil. One of the filter-drier units 42 is located in bypass line 44, and is disposed so that the check valve means 35 enables flow through the associated bypass line 44 and the filter-drier unit 42 in one direction and precludes flow in the opposite direction. Another bypass line 45 is provided across the second expansion device ahead of the indoor coil. A filter-drier unit 42 is located in bypass line 45, and is disposed so that its check valve means 35 enables flow in one direction and precludes flow in the opposite direction.

More particularly, the check valve means 35 of the filter-drier unit 42 in the bypass line 45 across the second expansion device ahead of the indoor coil enables flow only in a direction compatible with flow through the first expansion device ahead of the outdoor coil in one mode of operation, and the check valve means 35 of the other filter-drier unit 42 in the bypass line 44 across the first expansion device ahead of the outdoor coil enables flow only in a direction compatible with flow through the second expansion device ahead of the indoor coil in the other mode of operation.

It will first be assumed that the liquid flow in the liquid line 11 is to the right in FIG. 1 from the outdoor coil to the indoor coil in one mode of operation. The liquid flow from the outdoor coil will move through the bypass line 44 and its associated filter-drier unit 42 and bypass the associated first expansion valve. The liquid flow will then pass through the second expansion device ahead of the indoor coil. The check valve means 35 of the associated filter-drier unit 42 in bypass line 45 precludes flow through the filter-drier unit 42 and bypass line 45 across the second expansion device.

Flow of the refrigerant liquid in the opposite direction in the liquid refrigerant line 11 from the indoor coil to the outdoor coil in the other mode of operation will cause liquid to enter the bypass line 45 and pass through the associated filter-drier unit 42 across the associated second expansion device, thereby bypassing such second expansion device. Further flow in the liquid line 11 passes through the first expansion device ahead of the outdoor coil. The check valve means of the filter-drier unit 42 in the bypass line 44 across the first expansion device precludes flow through the bypass line 44 and the filter-drier unit 42.

It will be apparent that in each mode of operation of the heat pump system, the refrigerant flow in the liquid line 11 passes through one or the other of the filter-drier unit 42, and the appropriate expansion device for each mode of operation is fully operable.

The operation of the filter-drier unit 42 of FIG. 4 is identical to that described previously with respect to the filter-drier unit 20 and 20A. Refrigerant flow enters the filter-drier unit 42 through the inlet 22B. A portion of flow passes through the wire mesh of the screen tube 27B and passes through the desiccant 24B in order to attain drying of the refrigerant. Another portion of the flow passes through the bypass passage 33B and impinges on the screen tube 27B and washes dirt off of the screen tube 27B. This portion of the flow bypasses the desiccant 24B. The flow portions then combine and pass to the filter media 25B and passes out of the filter-drier unit 42 through the outlet 23B and is discharged through the check valve means 35. Again, it will be understood that under a condition of a slight reverse flow or draining of refrigerant liquid out of the inlet 22B, the screen tube 27B collects any desiccant 24B and precludes any such desiccant 24B from being washed out of the inlet 22B, and thereby kept out of the expansion devices and avoids possible blockage of the refrigerant flow.

Figure 5:
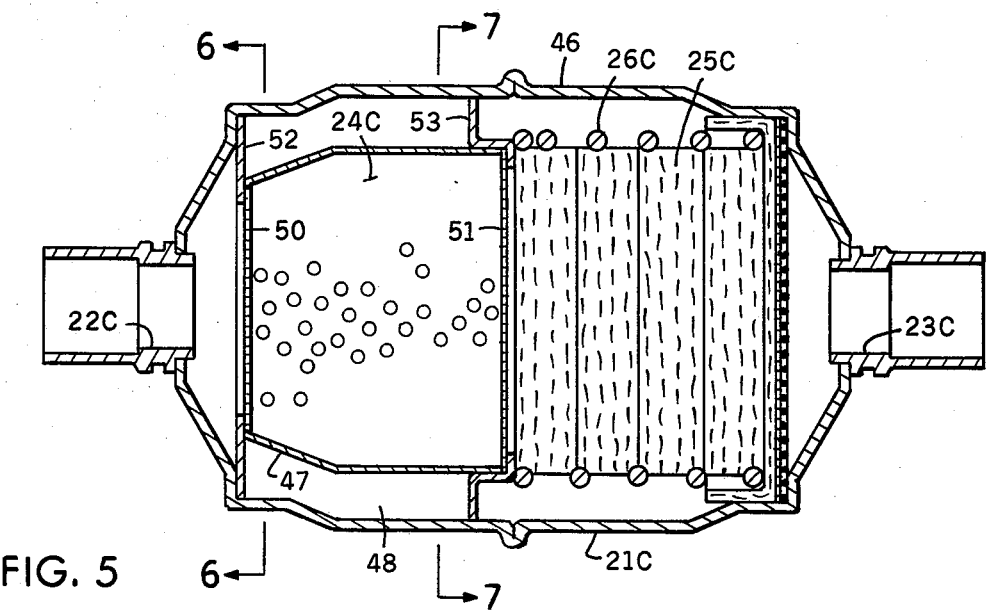
FIG. 5 is a longitudinal cross-sectional view of another embodiment of the filter-drier unit that can be utilized in the system of FIG. 3.
Figure 6:
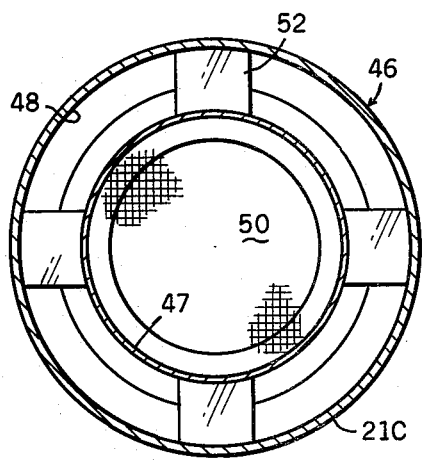
FIG. 6 is a cross-sectional view taken on line 6—6 of FIG. 5.
Figure 7:
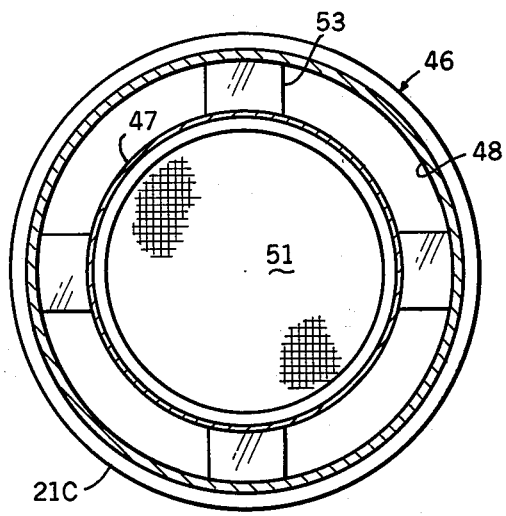
FIG. 7 is a cross-sectional view taken on line 7—7 of FIG. 5.

In another embodiment disclosed in FIG. 5, the filter-drier unit 46 includes a housing 21C provided with an inlet 22C and an outlet 23C. The desiccant 24C is contained in a housing 47 that is peripherally spaced from the outer housing 21C to provide the bypass passage 48 therebetween. The flow-directing means includes a flat screen 50 extending across the entry to the desiccant housing 47 upstream of the desiccant 24C and spaced from the inlet 22C. The bypass passage 48 communicates with the space between the inlet 22C, and the screen 50. Another flat screen 51 is extended across the exit of the desiccant housing 47. Spider elements 52 and 53 engage opposite ends of the desiccant housing 47 and extend across the housing 21C to hold the desiccant housing 47 in place.

The filter media 25C is contained by the wire form 26C, and is located between the desiccant 24C and the outlet 23C.

Again, the basic principle of operation of the filter-drier unit 46 is identical to that described previously with respect to the filter-drier units 20-20A-42 containing the screen tubes. For example, refrigerant flow enters the filter-drier unit 46 through the inlet 22C. A portion of the flow passes through the mesh of flat screen 50 and passes through the desiccant 24C for drying the refrigerant. Another portion of the liquid flow impinges on the screen 50 and washes any dirt off of the screen 50, and then moves through the bypass passage 48 without passing through the desiccant 24C. These flow portions then combine downstream of the desiccant 24C and pass through the filter media 25C and out of the filter-drier unit 46 through the outlet 23C.

When a condition of temporary reverse flow or drain occurs, the flat screen 50 prevents any desiccant 24C from migrating out of the inlet 22C. In this particular embodiment, it would be easier for any dirt collected from the system on the outer portions of the filter media 25C to migrate to the inlet 22C. However, most of the dirt from the system is fine enough so that it is embedded in the filter media 25C and does not migrate during a temporary backflow. On the other hand, the desiccant particles are large enough so that they would migrate out of the inlet 22C of the filter-drier unit 46 if the protecting screen 50 were not provided.

I claim as my invention:

1. A filter-drier unit for heat pump systems, comprising:
   (a) a housing provided with an inlet and outlet,
   (b) desiccant in the housing between the inlet and outlet,
   (c) flow-directing means including:
      1. a fine mesh screen in the housing between the inlet and desiccant for enabling a first flow from the inlet through the screen and desiccant,
      2. a passage bypassing the desiccant for enabling a second flow from the inlet through the passage, and
      3. the fine mesh screen collecting desiccant fines upon any reverse flow for precluding migration of desiccant out of the inlet,
   (d) the fine mesh screen is located relative to the inlet and bypass passage so that the second flow engages and moves past the screen for washing the screen and passing any dirt from the screen into and through the bypass passage,
   (e) a filter means is located in the housing between the desiccant and outlet for receiving the first flow through the desiccant and for receiving the second flow including any dirt washed from the screen from the bypass passage prior to movement through the outlet, the bypass passage enabling reverse flow from the filter means to the inlet,
   (f) a holder containing the desiccant, the holder being spaced peripherally from the housing to provide the bypass passage therebetween,
   (g) the fine mesh screen extends across the holder upstream of the desiccant and is spaced axially from the inlet to provide a space between the inlet and screen, and
   (h) the bypass passage communicates with the space between the inlet and screen so that the second flow engages and moves past the screen for washing the screen.

* * * * *